United States Patent
Yokoyama

[19]

[11] Patent Number: 5,880,943
[45] Date of Patent: Mar. 9, 1999

[54] SNUBBER CIRCUIT FOR A SWITCHING POWER SOURCE

[75] Inventor: Kenji Yokoyama, Hamamatsu, Japan

[73] Assignee: Yamaha Corporation, Hamamatsu, Japan

[21] Appl. No.: 837,711

[22] Filed: Apr. 22, 1997

[30] Foreign Application Priority Data

May 15, 1996 [JP] Japan .................................. 8-144951

[51] Int. Cl.⁶ ........................................... H02M 3/335
[52] U.S. Cl. ................... 363/56; 363/21; 363/97
[58] Field of Search ..................... 363/20, 21, 56, 363/97, 131

[56] References Cited

U.S. PATENT DOCUMENTS

| | | | |
|---|---|---|---|
| 4,595,977 | 6/1986 | Von Der Ohe | 363/56 |
| 4,870,554 | 9/1989 | Smith | 363/20 |
| 4,975,821 | 12/1990 | Lethellier | 363/21 |
| 5,621,625 | 4/1997 | Bang | 363/21 |
| 5,689,409 | 11/1997 | Scharlach et al. | 363/56 |

FOREIGN PATENT DOCUMENTS 0069463  4/1983  Japan ........................................ 363/56

*Primary Examiner*—Adolf Berhane
*Attorney, Agent, or Firm*—Loeb & Loeb LLP

[57] ABSTRACT

A snubber circuit is provided for a switching power source including a dc power source, a switching circuit and a transformer having a primary coil and a secondary coil in which the primary coil is connected to the dc power source through the switching circuit and an output is produced from the secondary coil by driving the switching element. The snubber circuit has a series circuit of a capacitor and a switching device connected in parallel to the primary coil of the transformer and in series to the switching element. The switching device is turned on substantially simultaneously with turning off of the switching element and thereby at this time causes resonance to be produced between the primary coil and the capacitor by energy which has been accumulated in the primary coil and causes the accumulated energy to be transferred to the secondary coil by the resonance. The switching device is turned off before turning on of the switching element.

8 Claims, 7 Drawing Sheets

SNUBBER CIRCUIT FOR A SWITCHING POWER SOURCE

BACKGROUND OF THE INVENTION

This invention relates to a snubber circuit for a switching power source such as a switching regulator and, more particularly, to a snubber circuit of this type with an improved efficiency.

In a switching power source such as a switching regulator, energy accumulated in a coil of a transformer while a switching element is on causes resonance with ambient floating capacity when the switching element is turned off with resulting occurrence of ringing with an accompanying overshoot. Ringing waves thus caused impart considerable stress to the switching element as well as produce undesirable noise to the outside. For restraining this ringing and thereby preventing occurrence of disorder in the switching element and reducing noise, a snubber circuit is connected to the switching element.

A switching power source including a prior art snubber circuit is shown in FIG. 2. A dc power source 10 is connected to a primary coil 16 of a transformer 14 through a switching element 12 and an output is produced from a secondary coil 18. A snubber circuit 26 is constructed of a series circuit of a diode 20 and a capacitor 22 which is connected in parallel with the primary coil 16 and a resistor 24 which is connected to the terminals of the capacitor 22. When the switching element 12 is turned off, energy which has been accumulated in the primary coil 16 of the transformer 14 is transferred to the capacitor 22 and consumed by the resistor 24 whereby the amplitude of ringing waves is held at a relatively low level.

In the prior art snubber circuit shown in FIG. 2, voltage which is substantially equivalent to power voltage E of the dc power source 10 (e.g., in the case of an AC/DC converter, DC 140 v in an area where AC 100 V is used and DC 320 V in an area where AC 230 V is used) is constantly applied to the terminals of the capacitor 22 and, therefore, current flows continuously through the resistor 24 (about 10 kohm to 20 kohm). This causes a loss in the order of 1 W to 3 W for obtaining the benefit of the snubber circuit 26 and thereby reduces efficiency of the snubber circuit 26 to that extent. Moreover, the prior art snubber circuit is disadvantageous in that it requires space for providing the resistor.

It is, therefore, an object of the present invention to provide a novel snubber circuit which has eliminated the above problem of the prior art snubber circuit and is capable of reducing a loss caused in the circuit.

SUMMARY OF THE INVENTION

For achieving the object of the invention, there is provided a snubber circuit for a switching power source including a dc power source, a switching element and a transformer having a primary coil and a secondary coil, said primary coil being connected to the dc power source through the switching element and an output being produced from the secondary coil by driving the switching element, said snubber circuit comprising a series circuit of a capacitor and a switching device connected in parallel to the primary coil of the transformer and in series to the switching element, said switching device being turned on substantially simultaneously with turning off of the switching element and thereby at this time causing resonance to be produced between the primary coil and the capacitor by energy which has been accumulated in the primary coil and causing the accumulated energy to be transferred to the secondary coil by the resonance, and said switching device being turned off before turning on of the switching element.

According to the invention, the energy which has been accumulated in the primary coil of the transformer while the switching element is off causes resonance between the primary coil and the capacitor and, during this resonance, the accumulated energy is transferred to the secondary coil to be regenerated therefrom. Accordingly, the accumulated energy is effectively utilized and a loss is reduced. Moreover, peaks of ringing waves which are produced by the resonance between the primary coil and the capacitor can be held at a lower level than those of ringing waves which are produced in a case where no measure is taken for preventing ringing, i.e., ringing waves caused by the primary coil and ambient floating capacity and, therefore, the functions of a snubber circuit, i.e., prevention of trouble to the switching element and reduction of noise, can be sufficiently performed. Since the switching device of the snubber circuit is turned off before the switching element of the switching power source is turned on, the operation of the switching device does not adversely affect the switching operation of the switching element.

In one aspect of the invention, the switching device of the snubber circuit is constructed of a bipolar switching transistor with the collector and emitter thereof being connected in series to the capacitor and the base thereof being connected to the primary coil so that, when the switching element has been turned off, the energy which has been accumulated in the primary coil causes a reverse current to flow from the base to the collector of said switching device and thereby to turn on the bipolar switching transistor, produce the resonance between the primary coil and the capacitor to bring the bipolar switching transistor into conduction in both forward and reverse directions, and enable the resonance to continue until charge accumulated in the base is discharged and the bipolar switching transistor is self-recovered.

According to this aspect of the invention, a timer function is realized by utilizing the accumulation effect (self-recovery function) of the bipolar transistor employed as the switching device, i.e., the bipolar transistor is turned on substantially simultaneously with turning off of the switching element and the bipolar transistor is turned off by self-recovery before next turning on of the switching element. According to this arrangement, provision of timing control signals from outside for turning on and off the switching device are unnecessary and, as a result, the snubber circuit can be constructed in a simple circuit design.

In another aspect of the invention, the snubber circuit utilizing the bipolar switching transistor as the switching device further comprises a discharge time setting device for setting discharge time of the charge accumulated in the base of the bipolar switching transistor for causing the bipolar switching transistor to be turned off before turning on of the switching element.

According to this aspect of the invention, the discharge time of the charge accumulated in the base of the bipolar switching transistor can be adjusted properly by the discharge time setting device and a proper timing of turning off of the switching device can thereby be adjusted.

In a preferred embodiment, the discharge time setting device may be a resistor connected between the base of the bipolar switching transistor and the primary coil.

Preferred embodiments of the invention will be described below with reference to the accompanying drawings.

BRIEF DESCRIPTION OF THE DRAWINGS

In the accompanying drawings.

DESCRIPTION OF PREFERRED EMBODIMENTS

Figure 1:
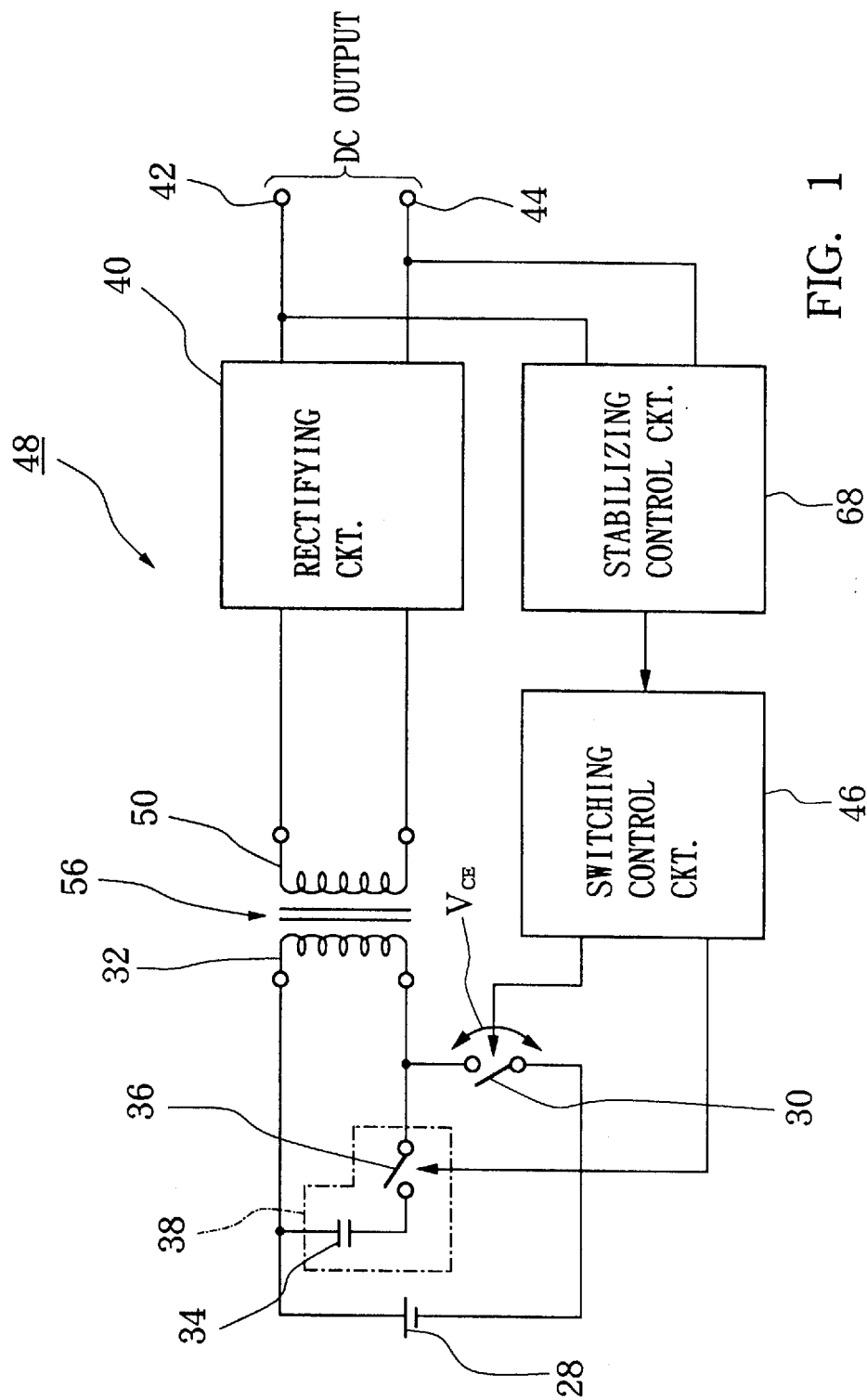
FIG. 1 is a circuit diagram showing an embodiment of the invention.

A switching regulator incorporating an embodiment of the snubber circuit made according to the present invention is shown in FIG. 1. In FIG. 1, a dc power source 28 is constructed as a circuit which directly rectifies and smoothes an ac power source voltage, e.g., commercial ac power voltage of AC 100 V or AC 230 V, and provides dc voltage. In a case where the ac voltage is AC 100 V, it produces DC 140 V and in a case where the ac voltage is AC 230 V, it produces DC 320 V. The dc power source 28 is not limited to this construction but a dc power source such as a storage battery may be directly used.

To the dc power source 28 is connected a primary coil 32 of a transformer 56 via a switching element 30 which is constructed of, e.g., an analog switch such as a switching transistor. A snubber circuit 38 is constructed of a series circuit of a capacitor 34 and a switching device 36. The switching device 36 is made conductive in both directions. As viewed from the dc power source 28, the snubber circuit 38 is connected in parallel to the primary coil 32 of the transformer 56 and in series to the switching element 30.

Figure 3:
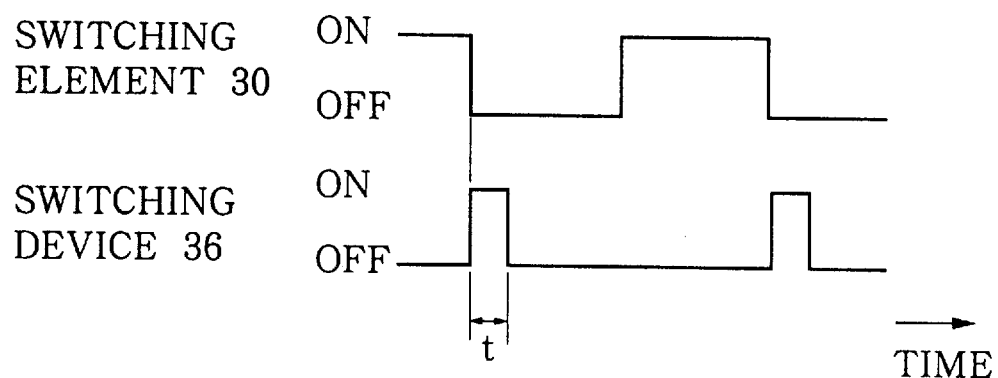
FIG. 3 is a time chart showing operation timings of the switching element and switching device of FIG. 1.

Voltage induced in a secondary coil 50 of the transformer 56 is rectified and smoothed by a rectifying circuit 40 to provide a dc output from output terminals 42 and 44. A stabilizing control circuit 68 monitors the dc output level and performs a control in such a manner that a predetermined output dc will be produced by controlling the on/off duty factor of the switching element 30. A switching control circuit 46 performs an on-off control of the switching device 36. More specifically, the switching control circuit 46 performs a control in such a manner that, as shown in FIG. 3, the switching device 36 is turned on substantially simultaneously with turning off of the switching element 30 and the switching device 36 is turned off upon lapse of a predetermined period of time t (before next turning on of the switching element 30).

According to this arrangement, while the switching element 30 is on, the switching device 36 is off and the primary coil 32 of the transformer 56 is excited by the dc power source 28 to induce voltage in the secondary coil 50. When the switching element 30 is turned off and the switching device 36 is turned on, energy which has been accumulated till then in the primary coil 32 causes resonance to be produced between the primary coil 32 and the capacitor 34. More specifically, the primary coil 32 causes current to flow continuously and this current charges the capacitor 34 through the switching device 36. Upon completion of charging of the capacitor 34, the capacitor 34 starts to discharge. Current now flows from the capacitor 34 to the primary coil 32 through the switching device 36. The resonance current thus produced by the resonance between the primary coil 32 and the capacitor 34 excites the primary coil 32 to induce voltage in the secondary coil 50. As a result, energy which was accumulated in the primary coil 32 until immediately before turning off of the switching element 30 is transferred to the secondary side of the transformer 56 and is regenerated therefrom and utilized effectively. Therefore, a resistor for consuming the accumulated energy such as the resistor 24 used in the prior art snubber circuit can be obviated and a loss can be reduced.

The switching device 36 is maintained in the on state at least during one cycle of the resonance, i.e., ringing. It may be maintained in the on state during plural cycles of the ringing. A major portion of the accumulated energy is transferred to the secondary side in the first cycle of the ringing and ringing waves of the second and subsequent cycles of the ringing are sharply attenuated. Accordingly, by turning off the switching device 36 at a certain timing after completion of the first cycle of the ringing, no large voltage s applied across the terminals of switching element 30, e.g., across collector and emitter of the switching transistor. Occurrence of a trouble in the switching element 30 therefore can be avoided and noise imparted to the outside can also be reduced. Since power consumption on the secondary side such as power consumption in the stabilizing circuit 44 (which is driven by consuming power on the secondary side) always exists even in a case where load connected to the output terminals 42 and 44 is small or nil, the regeneration operation on the secondary side is always performed.

The on time of the switching device 36 is so set that the switching device 36 is turned off sufficiently before next turning on of the switching element 30. For example, the switching device 36 is maintained in the on state only for a short period of time which is about one tenth of the switching period of the switching element 30. By this arrangement, occurrence of damage to circuit elements due to simultaneous conduction of the switching element 30 and the switching device 36.

Figure 2:
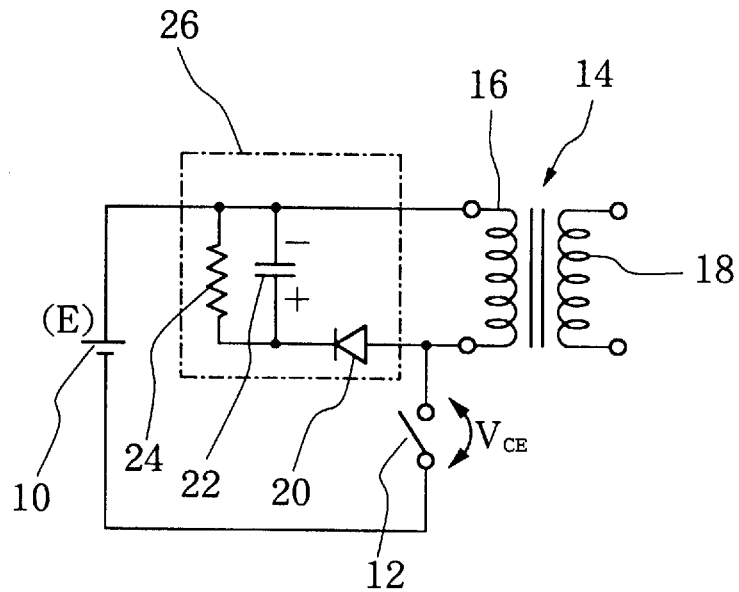
FIG. 2 is a circuit diagram showing a switching regulator including a prior art snubber circuit.
Figure 4A:
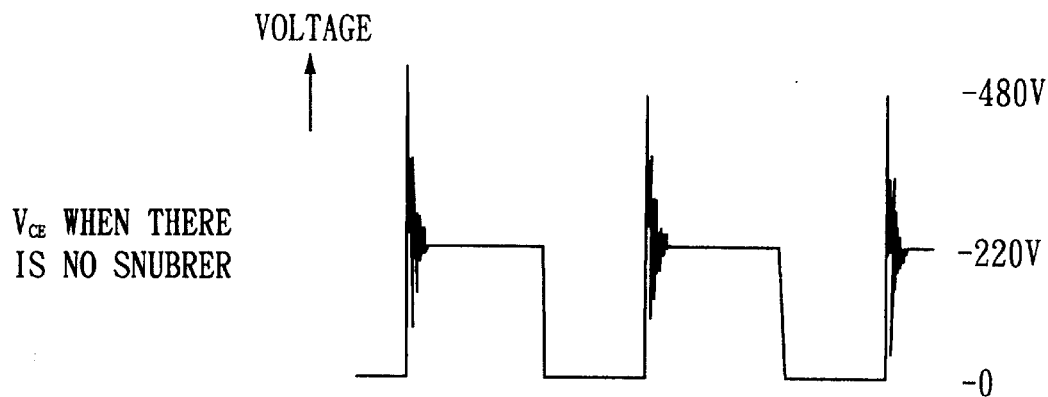
FIGS. 4A, 4B and 4C are waveform diagrams showing voltage waveforms appearing in the switching regulator of FIG. 1, switching regulator of FIG. 2 and in a case where there is no snubber circuit.
Figure 4B:
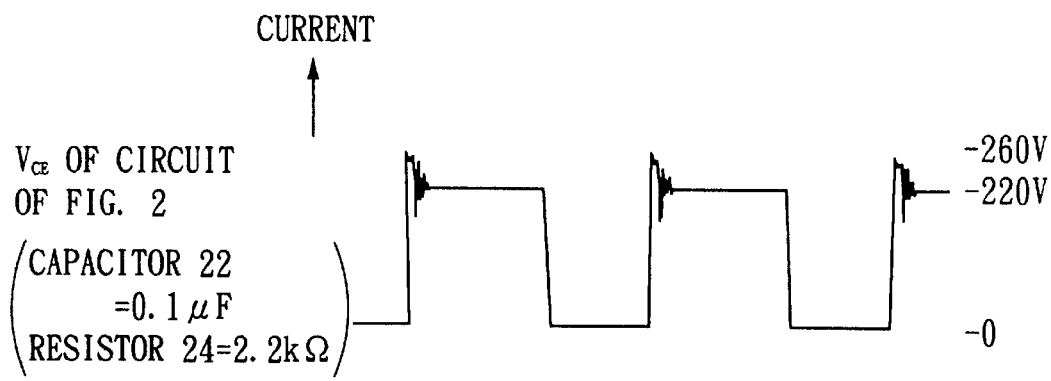
Figure 4C:
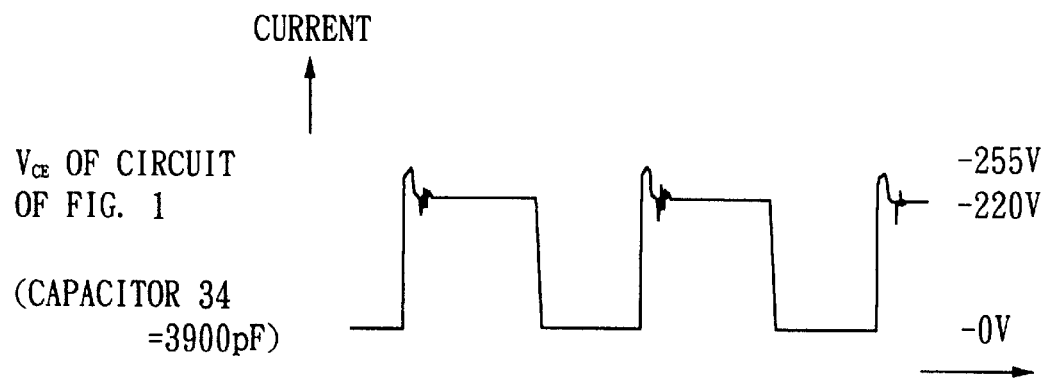

An example of voltage across the switching element 30 in the switching regulator 48 of FIG. 1, i.e., voltage $V_{CE}$, is shown in FIGS. 4A, 4B and 4C. FIG. 4A shows $V_{CE}$ when there is no snubber circuit, FIG. 4B shows $V_{CE}$ of the resistor consumption type prior art snubber circuit of FIG. 2 in which capacity of the capacitor 22 is 0.1 microfarad and resistance of the resistor 24 is 22 kilohms, and FIG. 4C shows $V_{CE}$ of the snubber circuit of FIG. 1 in which capacity of the capacitor 34 is 3900 picofarads. In all cases, the dc input voltage is set at 140 V. According to these figures, the peak voltage of ringing waves in the circuit of FIG. 1 is held at a low level as in the circuit of FIG. 2. Moreover, in the circuit of FIG. 1, the capacity of the capacitor can be made lower than the capacity in the circuit of FIG. 2 and the resistor can be obviated. Therefore, the circuit can be made in a compact circuit design.

Figure 5:
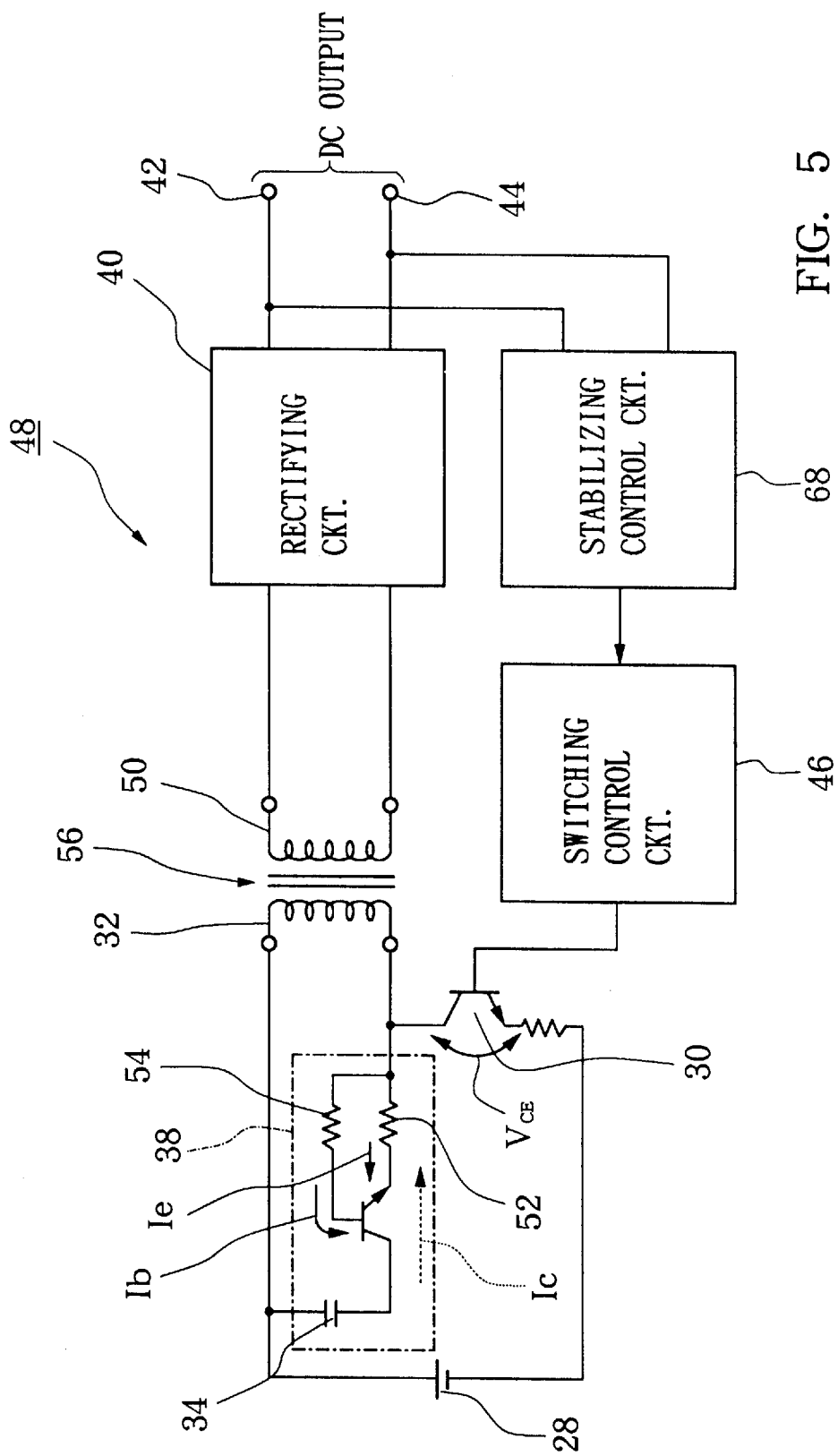
FIG. 5 is circuit diagram showing a specific example of the switching regulator shown in FIG. 1.

A specific example of the switching regulator 48 is shown in FIG. 5. The switching element 30 is constructed of a bipolar switching transistor and is driven by the switching control circuit 46 at a switching period of, e.g., 50 kHz to 100 kHz. The switching device 36 of the snubber circuit 38 is constructed of a bipolar switching transistor. The collector and the emitter of the transistor 36 are connected to the primary coil 32 so that, when the switching element 30 has been turned off, the collector and emitter will become a reverse direction to current flowing from the primary coil 32. To the emitter of the transistor 36 is connected a resistor 52 for restricting the collector current. The base of the transistor 36 is connected to a terminal of the primary coil 32 (a terminal from which current flows when the switching element 30 is turned off) through a resistor 54 which is provided for determining the base current.

In the above described circuit, when the switching element 30 is on, the transistor 36 is off because the base and the emitter thereof are of the same potential. When the switching element 30 is turned off, energy which has been accumulated in the primary coil 32 causes current to flow in the primary coil 32. A part of this current Ib flows in reverse direction from the base to the collector of the transitor 36 through the resistor 54 (i.e., the current flows in forward direction to the PN junction between the base and the collector). Since a saturation characteristic can be obtained in a bipolar transistor owing to its reverse direction characteristic if the collector and emitter thereof are reversed (although power amplification in this case is small), the transistor 36 is turned on and the rest of current from the primary coil 32 flows in reverse direction from the emitter to the collector as current Ie and thereby charges the capacitor 34.

Upon completion of charging of the capacitor 34, the capacitor 34 starts to discharge. More specifically, since charge (carrier) is accumulated in the base by the current Ib which has flown in reverse direction from the base to the collector during charging, the transistor 36 continues to be in conduction after completion of charging of the capacitor 34 and the discharging current from the capacitor 34 flows in forward direction as current Ic from the collector to the emitter of the transistor 36. The transistor 36 continues to be in conduction during discharging of the charge accumulated in the base thereof (i.e., during the accumulation effect of the carrier or self-recovery period) and the primary coil 32 is excited by current caused by the resonance between the primary coil 32 and the capacitor 34 and the accumulated energy is transferred to the secondary side and is regenerated therefrom. The carrier accumulation effect time can be adjusted by suitably selecting the value of resistance of the resistor 54 connected between the base and the primary coil 32. As the resistors 52 and 54, resistors of a relatively small resistance value between several ten of ohms to several hundred ohms may be employed and, therefore, these resistors 52 and 54 produce only a small heat loss.

Since a major portion of the accumulated energy is transferred to the secondary side by the first ringing wave, voltage produced by the second and subsequent ringing waves is low. Therefore, pouring of charge in the base is substantially completed by the first ringing wave so that the conduction time of the transistor 36 is substantially determined by the period of time during which the charge which is accumulated in the base by the first ringing wave is discharged.

Figure 6:
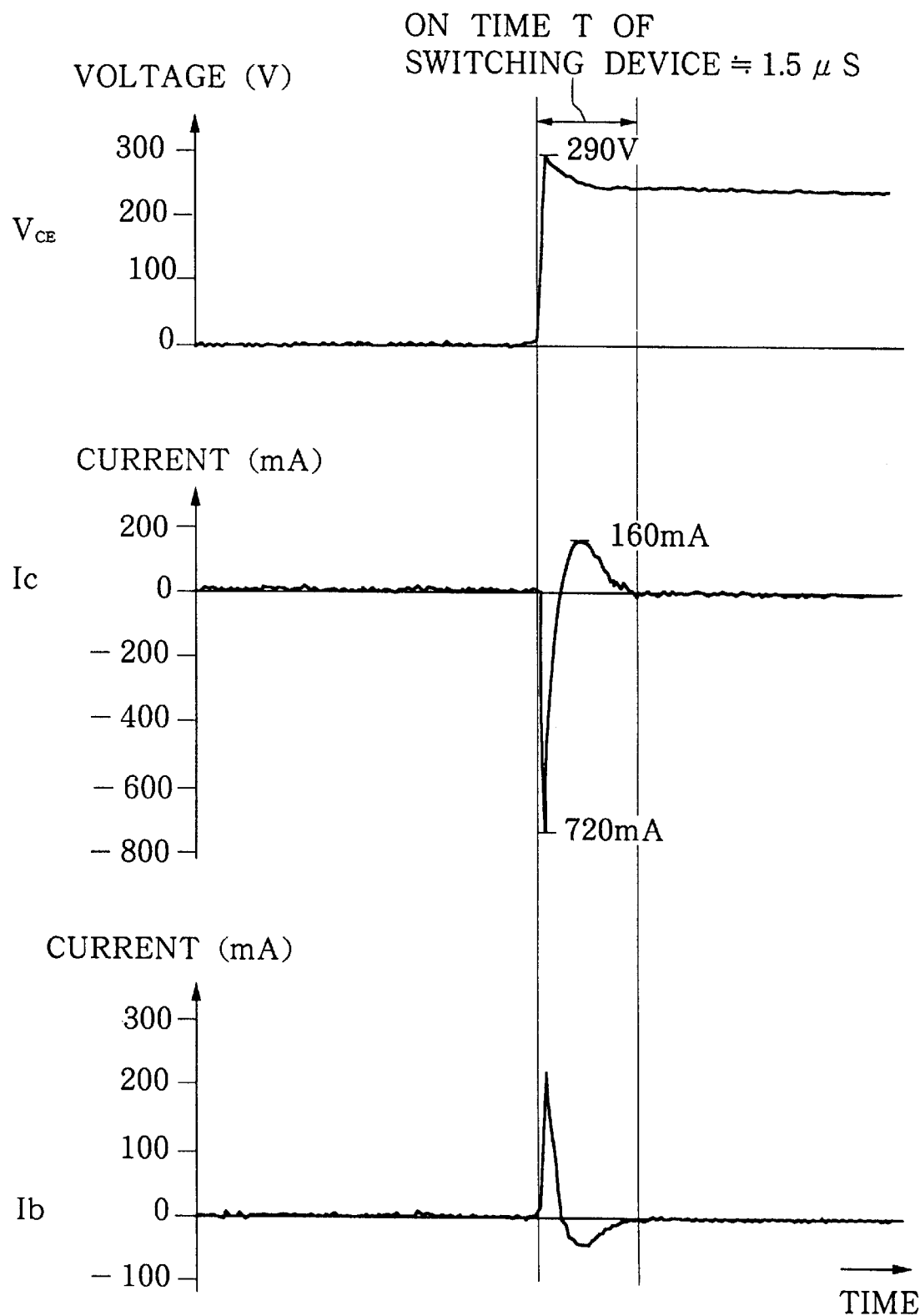
FIG. 6 is a waveform diagram showing the operation of the circuit of FIG. 5.

As one specific example of the snubber circuit 38 of FIG. 5, the transistor 36 may be constructed of a bipolar switching transitor 2SD1350A, the resistance value of the resistors 52 and 54 may be set at 82 ohms respectively and the capacity of the capacitor 34 may be set at 3900 picofarads. In this circuit, the switching period of the switching element 30 may be set, e.g., at 50 kHz to 100 kHz. Waveforms of voltage $V_{CE}$ and currents Ic and Ib produced in this specific circuit in which the voltage of the dc power source 28 is 140 V are shown in FIG. 6. The ringing frequency of the ringing waves caused by the primary coil 32 and the capacitor 34 becomes 2 MHz to 5 MHz and the on time t of the transistor 36 becomes about one cycle (about 1.5 microseconds) of the ringing.

According to the circuit of FIG. 5, the timer operation is performed by the carrier accumulation effect obtained by utilizing the reverse direction characteristic of the transistor 36 so that no particular arrangement is necessary for giving on-off timing signals to the snubber circuit and, therefore, the circuit design can be simplified. Moreover, since the transistor 36 operates in a saturation region, its loss is relatively small (in the order of 0.1 W). The operation waveforms of the circuit are smooth and little noise is produced. Besides, overshoot voltage (ringing voltage) applied to the switching element 30 is reduced so that voltage resistivity of the switching element 30 can be reduced with the result that a relatively inexpensive switching transistor may be used as the transistor 36.

Figure 7:
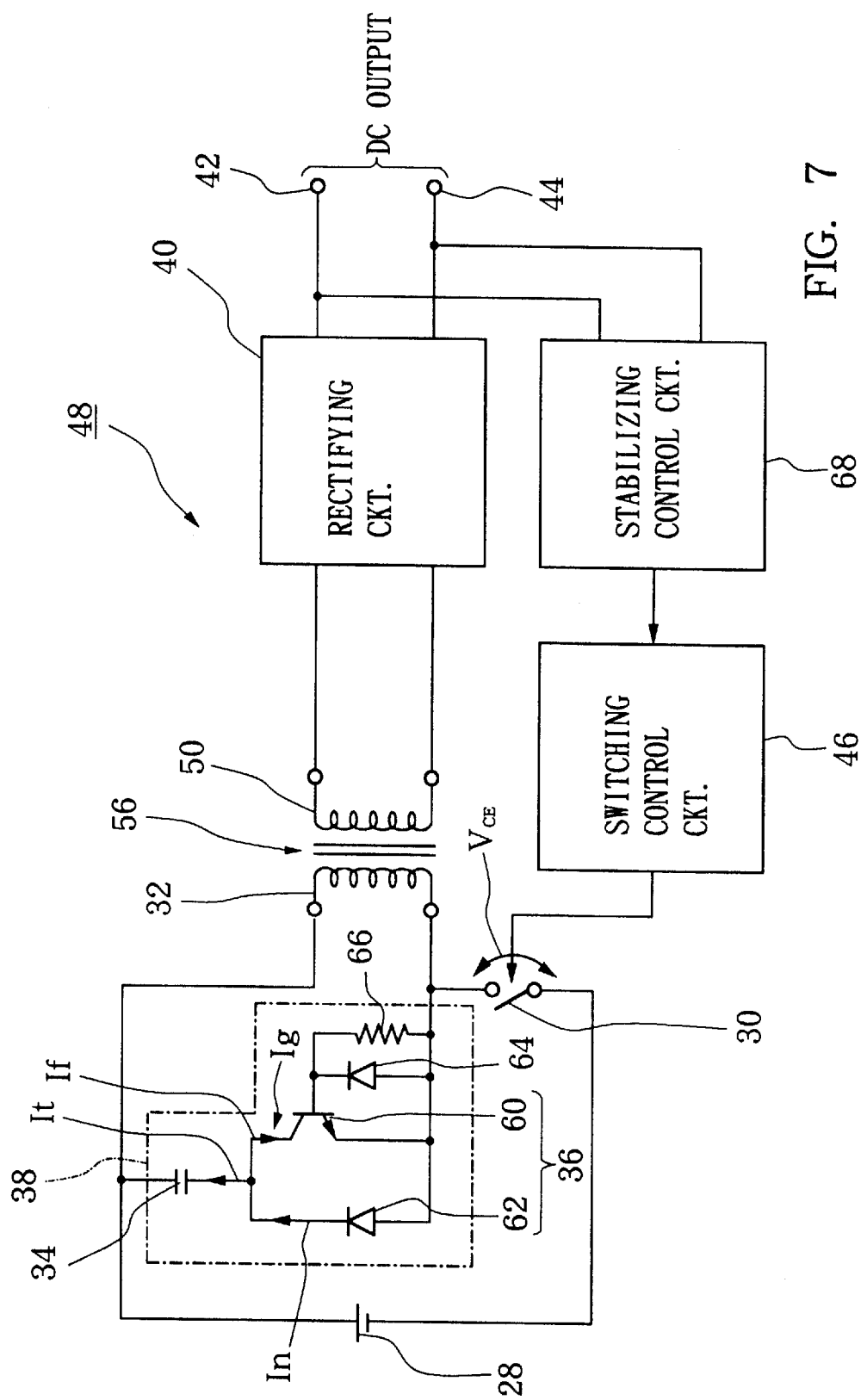
FIG. 7 is a circuit diagram showing another specific example of the switching regulator shown in FIG. 1.
Figure 8:
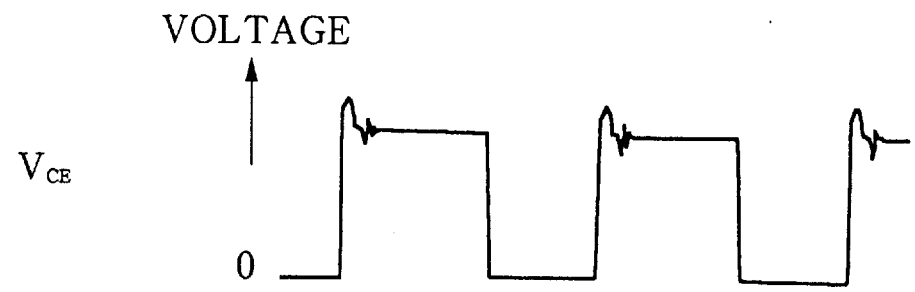
FIG. 8 is a waveform diagram showing the operation of the circuit of FIG. 7.
Figure 8:
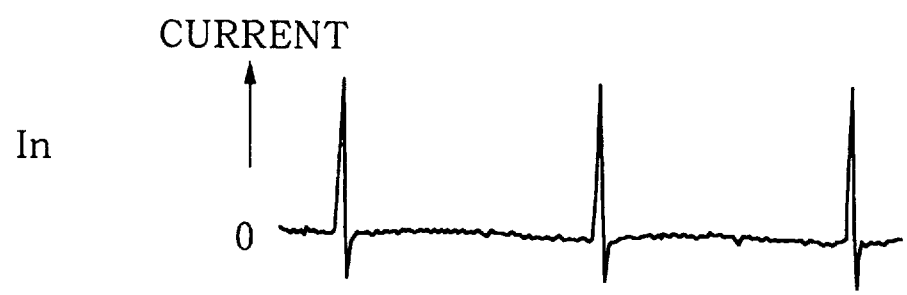
Figure 8:
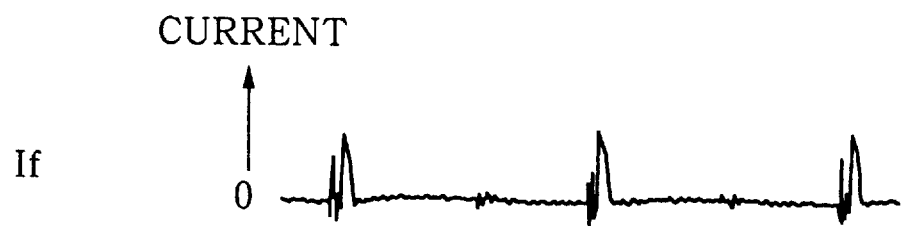
Figure 8:
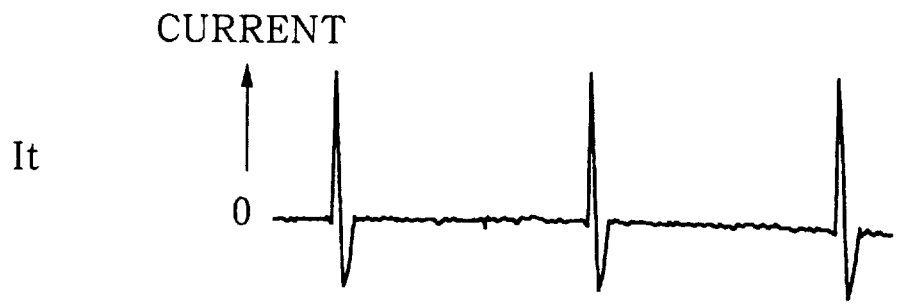

Another specific example of the switching regulator 48 is shown in FIG. 7. In this circuit, the switching device 36 of the snubber circuit 38 is constructed of a switching transistor 60 and a diode 62. When the switching element 30 is turned off, current Ig caused by energy accumulated in the primary coil 32 flows in reverse direction from the base to the collector of the transistor 60 through a diode 64. Simultaneously, current In flows through the diode 62 and the capacitor 34 is charged by a sum current It of these currents Ig an In. The transistor 60 continues to be in conduction owing to the charge accumulated in the base thereof even after completion of charging of the capacitor 34 and discharging current If of the capacitor 34 flows from the collector to the emitter of the transistor 60 and further to the primary coil 32. The charge accumulated in the base of the transistor 60 is discharged through a resistor 66. The on time of the transistor 60 is adjusted by suitably determining the value of resistance of the resistor 66. Waveforms of voltage $V_{CE}$, currents In, If and It appearing in the circuit of FIG. 7 are shown in FIG. 8.

What is claimed is:

1. A snubber circuit for a switching power source including a dc power source, a switching element and a transformer having a primary coil and a secondary coil, said primary coil being connected to the dc power source through the switching element and an output being produced from the secondary coil by driving the switching element, said snubber circuit comprising a series circuit of a capacitor and a switching device connected in parallel to the primary coil of the transformer and in series to the switching element, said switching device being turned on substantially simultaneously with turning off of the switching element and thereby at this time causing resonance to be produced between the primary coil and the capacitor by energy which has been accumulated in the primary coil and causing the accumulated energy to be transferred to the secondary coil by the resonance, and said switching device being turned off before turning on of the switching element.

2. A snubber circuit as defined in claim 1 wherein said switching device is a biploar switching transistor with the collector and emitter thereof being connected in series to the capacitor and the base thereof being connected to the primary coil so that, when the switching element has been turned off, the energy which has been accumulated in the primary coil causes a reverse current to flow from the base to the collector of said switching device and thereby to turn on the bipolar switching transistor, produce the resonance between the primary coil and the capacitor to bring the bipolar switching transistor into conduction in both forward and reverse directions, and enable the resonance to continue until charge accumulated in the base is discharged and the bipolar switching transistor is self-recovered.

3. A snubber circuit as defined in claim 2 which further comprises a discharge time setting device for setting discharge time of the charge accumulated in the base of the bipolar switching transistor for causing the bipolar switching transistor to be turned off before turning on of the switching element.

4. A snubber circuit as defined in claim 3 wherein said discharge time setting device is a resistor connected between the base of the bipolar switching transistor and the primary coil.

5. A snubber circuit for a switching power source including a dc power source, a transformer having a primary coil and a secondary coil, said primary coil being connected to the dc power source, and first switching means connected between the dc power source and the primary coil for switching on and off flow of current from the dc power source to the primary coil, an output being produced from the secondary coil by driving the first switching means, said snubber circuit comprising a series circuit capacitor means and second switching means for switching on and off flow current between the primary coil and the capacitor means, said series circuit being connected in parallel to the primary coil of the transformer and in series to the first switching means, said second switching means being turned on substantially simultaneously with turning off of the first switching means and thereby at this time causing resonance to be produced between the primary coil and the capacitor means by energy which has been accumulated in the primary coil and causing the accumulated energy to be transferred to the secondary coil by the resonance, and said second switching means being turned off before turning on of the first switching means.

6. A method for protecting a switching element of a switching power source comprising steps of:

providing a snubber circuit for a switching power source including a dc power source, a switching circuit and a transformer having a primary coil and a secondary coil, said primary coil being connected to the dc power source through the switching circuit and an output being produced from the secondary coil by driving the switching element, said snubber circuit comprising a series circuit of a capacitor and a switching device connected in parallel to the primary coil of the transformer and in series to the switching element;

turning on said switching device being turned on substantially simultaneously with turning off of the switching element and thereby at this time causing resonance to be produced between the primary coil and the capacitor by energy which has been accumulated in the primary coil and causing the accumulated energy to be transferred to the secondary coil by the resonance; and turning off said switching device before turning on of the switching element.

7. A snubber circuit for a switching power source including a dc power source, a switching element and a transformer having a primary coil and a secondary coil, said primary coil being connected to the dc power source through the switching element and an output being produced from the secondary coil by driving the switching element, said snubber circuit comprising:

a series circuit of a capacitor and a switching device connected in parallel to the primary coil of the transformer and in series with the switching element, said switching device being turned on substantially simultaneously with turning off of the switching element and thereby at this time causing resonance to be produced between the primary coil and the capacitor by energy which has been accumulated in the primary coil and causing the accumulated energy to be transferred to the secondary coil by the resonance, and said switching element being turned off before turning on of the switching element;

wherein timer operation is performed by the carrier accumulation effect obtained by utilizing a reverse direction characteristic of a transistor operating in a saturation region with a relatively small loss; and overshoot voltage applied to the switching element is reduced, whereby voltage resistivity of the switching element is reduced.

8. A snubber circuit for a switching power source including a dc power source, a switching element and a transformer having a primary coil and a secondary coil, said primary coil being connected to the dc power source through the switching element and an output being produced from the secondary coil by driving the switching element, said snubber circuit further comprising:

a switching device being made up of a switching transistor and a diode;

whereby when the switching element is turned off, current caused by energy accumulated in the primary coil flows in a reverse direction from a base to the collector of the transistor through the diode and at the same time current in flows through the diode and the capacitor is charged by a sum of these respective currents;

the transistor continues to be in conduction owing to the charge accumulated in the base thereof following completion of charging of the capacitor and discharging current in the capacitor flows from a collector to the emitter of the transistor and further to the primary coil; and, wherein charge accumulated in the base of the transistor is discharged through a resistor and the on time of the transistor id adjusted by suitably determining the value of resistance of the resistor.

\* \* \* \* \*